UNITED STATES PATENT OFFICE 2,650,909

COATING COMPOSITIONS

Carl L. Betsch and Fred H. Detrick,
Philadelphia, Pa.

No Drawing. Application December 3, 1951,
Serial No. 260,326

3 Claims. (Cl. 260—31.8)

This is a continuation-in-part of our copending application Serial No. 101,253, filed June 24, 1949.

The invention relates to coating materials and is more particularly concerned with compositions for application to surfaces which are ordinarily difficult to coat.

One of the uses of the composition of this invention is in the field of sign manufacturing. For example, in plastic signs, such as those made of Plexiglas (methylacrylate) or Lucite (polymerized methyl methacrylate resin), the composition of the invention may be used to apply a coating or legend thereon which is durable, which adheres to the plastic and which is sufficiently flexible to prevent it from cracking or chipping under bending stresses to which the plastic material may be subjected.

An object of the invention is the provision of compositions of the type mentioned which can be used for the purposes mentioned and which may be sprayed, screened, or brushed on a surface.

Another object of the invention is the provision of such a composition which becomes an integral part of a plastic material to which it may be applied without the need for applying any heat or pressure.

A further object is the provision of a composition of the type mentioned which, although not requiring heat or pressure to apply it, can be subjected to heat and pressure for deforming or molding the material to which it is applied without injuring it, even where the deformation requires the bending of specific areas of the plastic to which the coating composition has been applied.

In general, the composition of the invention includes an acrylic resin, a pigment and a solvent or thinner. Any acrylic resin may be used such as methacrylic, dimethylacrylic, phenylacrylic and hydroxyacrylic resins, particularly polymerized methylacrylate and polymethylmethacrylate.

Any desired pigment may be used including metallic pigments such as aluminum powder, bronze powder and zinc dust; metallic oxides such as titanium dioxide, iron oxide and lead chromate; and organic pigments such as toluodine red, copper thalocyanine blue, and benzidine yellow.

Suitable solvents and thinners include the various esters of acetic, lactic and oxalic acids and any of the various ketones and aromatic hydrocarbons having resin solvent characteristics, such as acetone, methyl ethyl ketone, xylol, methyl propyl ketone, butyl lactate, methyl lactate, ethyl lactate, ethyl acetate, butyl acetate, amyl acetate, dibutyl oxalate, diphenyl oxalate, methyl ethyl oxalate, benzene, napthalene, and toluene.

In addition to the above ingredients, it is also desirable to add a wetting agent to facilitate the preparation of the composition. Any known conventional wetting agent may be used such as nuade, pine oil, sulfoxylylstearate and sulfotolylstearic acid.

The following examples will further illustrate the invention:

Example I

| | |
|---|---|
| Pigment | 20 lbs. |
| Wetting agent | 2½ fl. oz. |
| Acrylic resin | 3½ gal. |
| Dibutyl oxalate | 50 fl. oz. |
| Butyl lactate | 80 fl. oz. |

This formulation yields five gallons of a composition in accordance with this invention which is particularly suitable for silk screening.

Example II

| | |
|---|---|
| Pigment | 20 lbs. |
| Wetting agent | 2½ fl. oz. |
| Acrylic resin | 4½ gal. |
| Dibutyl oxalate | 50 fl. oz. |
| Butyl lactate | 1 gal. to 80 fl. oz. |
| Xylol | 1 gal. |

This results in eight gallons of a coating composition suitable for application by brushing.

Example III

| | |
|---|---|
| Pigment | 20 lbs. |
| Wetting agent | 2½ fl. oz. |
| Acrylic resin | 6 gal. |
| Dibutyl oxalate | 50 fl. oz. |
| Butyl lactate | 80 fl. oz. |
| Xylol | 7½ fl. oz. |
| Methyl ethyl ketone | 1 gal. |

This formulation yields sixteen gallons of a composition especially useful for application by spraying.

In using the compositions of this invention for applying designs and legends to plastic signs the composition etches the plastic and becomes bonded thereto. Subsequent molding under heat and pressure does not destroy the composition or its bond with the plastic.

We claim:

1. A liquid coating composition for application to the surfaces of plastic materials, said composition being characterized by the fact that it becomes bonded to plastic materials without heat and pressure and is resistant to molding treatment, including heat, said composition comprising the following materials in substantially the proportions indicated: 20 pounds pigment, 2½ fluid ounces wetting agent, 3½ to 6 gallons acrylic resin, 50 fluid ounces dibutyl oxalate and 80 fluid ounces to 1 gallon butyl lactate, said resin being selected from the group consisting of polymerized methylacrylate and polymethyl-methacrylate.

2. A liquid coating composition for application to the surfaces of plastic materials, said composition being characterized by the fact that it becomes bonded to plastic materials without heat and pressure and is resistant to molding treatment, including heat, said composition comprising the following materials in substantially the proportions indicated: 20 pounds pigment, 2½ fluid ounces wetting agent, 3½ to 6 gallons acrylic resin, 50 fluid ounces dibutyl oxalate, 80 fluid ounces to 1 gallon butyl lactate, and 7½ fluid ounces to 1 gallon xylol, said resin being selected from the group consisting of polymerized methylacrylate and polymethyl-methacrylate.

3. A liquid coating composition for application to the surfaces of plastic materials, said composition being characterized by the fact that it becomes bonded to plastic materials without heat and pressure and is resistant to molding treatment, including heat, said composition comprising the following materials in substantially the proportions indicated: 20 pounds pigment, 2½ fluid ounces wetting agent, 3½ to 6 gallons acrylic resin, 50 fluid ounces dibutyl oxalate, 80 fluid ounces to 1 gallon butyl lactate, 7½ fluid ounces to 1 gallon xylol and 1 gallon methyl ethyl ketone, said resin being selected from the group consisting of polymerized methylacrylate and polymethyl-methacrylate.

CARL L. BETSCH.
FRED H. DETRICK.

References Cited in the file of this patent

UNITED STATES PATENTS

| Number | Name | Date |
|---|---|---|
| 2,320,533 | Muskat et al. | June 1, 1943 |
| 2,407,668 | Leatherman | Sept. 17, 1946 |
| 2,578,665 | Bjorksten et al. | Dec. 18, 1951 |
| 2,578,683 | Fiedler et al. | Dec. 18, 1951 |

OTHER REFERENCES

Industrial and Engineering Chemistry, article by Strain et al., April 1939, vol. 31, No. 4, pages 382–385.